United States Patent Office 3,226,390
Patented Dec. 28, 1965

3,226,390
OXIDATION WITH NICKEL PEROXIDE
Kunio Nakagawa, Nishinomiya-shi, Hyogo, and Takamori Konaka, Amagasaki-shi, Hyogo, Japan, assignors to Shionogi & Co., Ltd., Osaka, Japan
No Drawing. Filed Aug. 23, 1962, Ser. No. 218,825
Claims priority, application Japan, Aug. 25, 1961, 36/30,817
5 Claims. (Cl. 260—285)

The present invention relates to a process for oxidizing an organic compound, and particularly to a process for oxidizing an unsaturated alcohol to the corresponding carbonyl compound. More particularly, it relates to the use of nickel peroxide for the oxidation of the unsaturated alcohol having a structure represented by the formula:

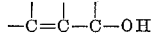

in the molecule to the corresponding unsaturated carbonyl compound having a structure represented by the formula:

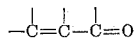

in the molecule.

In the present specification, the term "nickel peroxide" is expediently applied to designate the black, hydrous, higher oxides of nickel which are formed by reaction between a strong oxidizing agent, such as alkali hypohalites or alkali persulfates, and freshly precipitated nickelous hydroxide.

Of the known oxidants, manganese dioxide has been preferably employed for oxidizing the said unsaturated alcohol to the corresponding carbonyl compound, because of its selective oxidation power. However, manganese dioxide which possesses a constant oxidizing activity has been produced only with difficulty, and it is necessary to use a large excess of this oxident, normally from several to several tens times the theoretical amount, for surely attaining the object in view. Further, oxidation power of the manganese dioxide is relatively weak and it takes a long time for completion of the oxidation.

It has been now discovered that the use of nickel peroxide in the oxidation of the said unsaturated alcohol gives good results without any of the defects experienced in the use of manganese dioxide. Thus, the said unsaturated alcohol is readily oxidized with nickel peroxide in an organic solvent medium to give the corresponding unsaturated carbonyl compound in a good yield. Generally speaking, nickel peroxide has a stronger oxidation power than manganese dioxide, and former possesses the selectivity in oxidation as well as the latter. Accordingly, oxidation using nickel peroxide can be accomplished at a relatively low temperature in a short time. It may be especially noted that nickel peroxide which possesses a constant oxidizing activity can be readily obtained in a simple method. In addition, it may be also noted that the available oxygen in the nickel peroxide can be used much more effectively in the oxidation, compared with active manganese dioxide. Thus, the use of nickel peroxide in a slightly excess amount, normally from one to two times the theoretical amount, is enough to obtain a satisfactory result. For instance, the results of the oxidation of benzyl alcohol with a certain amount of nickel peroxide or manganese dioxide in benzene are shown as follows:

| Oxidant | Equivalent amount of oxidant [a] | Reaction temperature (° C.) | Reaction time (hour) | Yield of product (percent) | |
|---|---|---|---|---|---|
| | | | | Benzaldehyde | Benzoic acid |
| Manganese dioxide | 1.0 | 70 | 3 | 26.7 | 0.9 |
| Nickel peroxide | | | | 76.0 | 0.4 |
| Manganese dioxide | 1.2 | 50 | 3 | 27.6 | 0.4 |
| Nickel peroxide | | | | 90.8 | 1.8 |

[a] Ratio of oxidizing agent to benzyl alcohol based on the available oxygen.

From the illustration made hereinabove, advantages present in the oxidation method using nickel peroxide will be obvious to those skilled in the art to which the present invention pertains. Additionally, it may be considered as an advantage of the present invention that the nickel peroxide can be readily separated from the reaction mixture by a simple operation, i.e. filtration. Further, it is also an advantage that the nickel peroxide employed in the oxidation can be easily renewed by a simple procedure, i.e. the treatment with a strong oxidizing agent such as alkali hypohalites or alkali persulfates.

Accordingly, an object of the present invention is to embody a process for oxidizing an organic compound, especially an unsaturated alcohol. Another object is to embody an economical process for oxidizing an unsaturated alcohol to the corresponding unsaturated carbonyl compound. A further object is to embody a utilization method of nickel peroxide. These and other objects will be apparent to those skilled in the art from the above and subsequent descriptions.

The process of the present invention comprises treating the unsaturated alcohol having a structure represented by the formula:

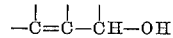

in the molecule with nickel peroxide in an inert organic solvent medium for several hours at a temperature from 0 to 90° C., normally from 30 to 70° C., to give the corresponding unsaturated carbonyl compound having a structure represented by the formula:

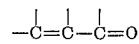

in the molecule.

The nickel peroxide possessing a high oxidizing activity may be prepared by treating a nickel salt (e.g. nickel chloride, nickel sulfate, nickel carbonate, nickel nitrate) with a strong oxidizing agent such as alkali hypohalites (e.g. sodium hypochlorite, potassium hypochloriate, sodium hypobromite) or alkali persulfates (e.g. sodium persulfate, potassium persulfate) in an aqueous alkaline medium. Alternatively nickel peroxide may be prepared by treating the oxides of nickel with an alkali hypohalite in an aqueous alkaline medium, the said oxides being obtained by any conventional methods, e.g.

(a) The oxide prepared by treating $NiSO_4$ with aqueous NaOH and drying the precipitated $Ni(OH)_2$ for 1.5 hours at 500° C., (b) The oxide prepared by drying
$$NiCO_3.2Ni(OH)_2.4H_2O$$
for 2 hours at 500° C., (c) The oxide prepared by drying $Ni(NO_3)_2.6H_2O$ for 2 hours at 500° C., (d) The commercially available oxide having the formula: $Ni_2O_3$.

However, the nickel peroxide obtained in the latter method is usually much inferior to that prepared by the former method in the oxidizing activity. One of the presently-preferred procedures for obtaining highly active nickel peroxide is set forth as follows:

To a solution of nickel sulfate hydrate ($NiSO_4.6H_2O$) (130 mg.) in water (300 ml.), there is added dropwise a solution of sodium hydroxide (42 g.) in 6% sodium hypochlorite (300 ml.) while stirring, and the resultant mixture is stirred for about 30 minutes at a temperature between 10 and 25° C. The black precipitate is collected by filtration, washed with water to remove active chlorine and, after crushing the cake to powder, dried over anhydrous calcium chloride under reduced pressure.

The nickel peroxide is a black fine powder containing a considerable amount of water. The results of quantitative analysis make it possible to give the molecular formula: $Ni_2O_3.3H_2O$ or $Ni(OH)_3$ to the oxidant, but the structure has not yet been confirmed. The nickel peroxide possesses usually about $0.3 \sim 0.4 \times 10^{-2}$ g.-atom of available oxygen per gram (measured by titrating the iodine, produced from the reaction between the nickel peroxide and potassium iodide in acetic acid, with sodium thiosulfate), of which a considerable portion is lost gradually when heated, but remains for a long time when stored at room temperature under protection against atmospheric moisture. Since it has remarkably broad surface compared with its weight, the available oxygen can be used effectively in the oxidation reaction. Owing to this character of the reagent, the present oxidation can advantageously be completed in a short time normally with one to two equivalent amounts of the oxidant.

The optimum reaction conditions such as reaction medium, reaction temperature, reaction time and amount of the oxidant are more or less associated with the kind of the starting unsaturated alcohols. Therefore, preferred conditions are selected in each case. As the reaction medium, there may be used, for example hydrocarbons, ethers, halogenohydrocarbons, acid amides and thioethers. When the oxidation is carried out in an aqueous alkaline medium, there is usually produced not an unsaturated carbonyl compound but a carboxylic acid as the main product. Although the reaction is ordinarily carried out from 30 to 70° C., a higher or lower temperature is also operative, provided that the amount of the oxidant is proper. Especially, it may be noted as a characteristic of the present process that the reaction can proceed satisfactorily even at a lower temperature than 30° C. This is highly advantageous, when the present process is applied to the oxidation of compounds unstable to heat. The reaction time may be from 30 minutes to 12 hours, normally 3 to 6 hours. The oxidant is employed usually from 1 to 1.2 times the theoretical amount. As a large excess of the oxidant rather results in poor yield of the product, the amount is preferably at the most two times the theoretical amount.

The recovery of the reaction product from the reaction mixture may be carried out by separating the nickel peroxide by filtration and treating the filtrate in per se conventional manner.

The nickel peroxide employed in the oxidation reaction can be readily renewed by a simple procedure, i.e. the treatment of the nickel peroxide with a strong oxidizing agent such as alkali hypohalite or alkali persulfate in an aqueous alkaline medium. An example of the presently-preferred renewal procedures is shown as follows:

The collected nickel peroxide is washed with water, stirred with 6% sodium hypochlorite (about ten times the quantity of nickel peroxide) in an aqueous alkaline medium for 20 minutes, filtered, washed with water and dried.

According to the general knowledge in the field of chemistry, it can be expected that higher oxides of such metals as chromium, manganese, iron and cobalt will have an oxidizing activity similar to nickel peroxide. However, none of the said oxides showed such a high activity for oxidizing unsaturated alcohol to the corresponding unsaturated carbonyl compound as nickel peroxide in the experiments carried out by the inventors. Thus, only nickel peroxide can be preferably employed in the present process.

The following examples set forth illustratively presently-preferred embodiments of the present invention.

In the examples, the abbreviations have the following significances: g., gram(s); mg., milligram(s); ml., millilitre(s); Anal. calcd., analysis calculated; and ° C., degrees centigrade. Other abbreviations have conventional significances.

*Example 1*

*Oxidation of benzyl alcohol.*—To a solution of benzyl alcohol (5 g.) in benzene (45 ml.), there is added a certain amount of nickel peroxide, and the resultant mixture is stirred on a magnetic stirrer at a given temperature. The reaction mixture is filtered by suction and the separated nickel peroxide is washed with benzene. The combined filtrate is treated with 2,4-dinitrophenylhydrazine hydrochloride to convert the produced benzaldehyde into its hydrazone, which is weighed for the calculation of the yield. The yield of the produced benzaldehyde is also calculated by the gas chromatography method. The results of the experiment carried out by the inventors are shown in the following table:

| Nickel peroxide a | Reaction temperature (° C.) | Reaction time (hour) | Yield of benzaldehyde (percent) | | Recovery of benzyl alcohol (percent) |
|---|---|---|---|---|---|
| | | | Hydrazone method | Gas chromatography method | |
| 1.0 | 70 | 3 | 74.4 | 76.0 | 12.1 |
| 1.1 | 50 | 3 | 84.2 | 85.0 | 5.7 |
| 1.2 | 30 | 6 | 88.4 | 90.4 | 2.7 |
| 1.2 | 50 | 3 | 88.3 | 90.8 | 0.9 |
| 1.2 | 80 | 1 | 90.2 | 92.0 | 0.7 |
| 1.5 | 50 | 3 | 73.1 | 75.8 | 0 | a Ratio of nickel peroxide to benzyl alcohol based on the available oxygen.

*Example 2*

*Oxidation of 1-phenylethanol.*—To a solution of 1-phenylethanol (5.027 g.) in benzene (45 ml.), there is added nickel peroxide (1.2 times the theoretical amount), and the resultant mixture is stirred for 3 hours at 50° C. and then filtered. Removing the solvent from the filtrate, there is obtained crude acetophenone, which is treated with 2,4-dinitrophenylhydrazine hydrochloride in a conventional manner whereby acetophenone hydrazone (6.27 g.) is obtained as crystals melting at 249 to 250° C.

*Example 3*

Oxidation of cinnamyl alcohol.—To a solution of cinnamyl alcohol (3.028 g.) in benzene (30 ml.), there is added nickel peroxide (1.2 times the theoretical amount), and the resultant mixture is stirred for 1 hour at 50° C. and then filtered. Removing the solvent from the filtrate, there is obtained crude cinnamaldehyde, which is treated with 2,4-dinitrophenylhydrazine hydrochloride in a conventional manner whereby cinnamaldehyde hydrazone (4.034 g.) is obtained as crystals melting at 254° C.

*Example 4*

Oxidation of benzoin.—To a solution of benzoin (5 g.) in benzene (200 ml.), there is added nickel peroxide (1.2 times the theoretical amount), and the resultant mixture is stirred for 5 hours at 50° C. and then filtered. Removing the solvent from the filtrate, the residue is crystallized from aqueous ethanol to give benzil (4.82 g.) as crystals melting at 233 to 235° C.

*Example 5*

Oxidation of benzohydrol.—To a solution of benzohydrol (5 g.) in benzene (45 ml.), there is added nickel peroxide (1.2 times the theoretical amount), and the resultant mixture is stirred for 6 hours at 50° C. and then filtered. Removing the solvent from the filtrate, the residue is crystallized from aqueous ethanol to give benzophenone (4.86 g.) as white plates melting at 48° C.

*Example 6*

Oxidation of methylbenzyl alcohol.—To a solution of o-, m- or p-methylbenzyl alcohol in benzene, there is added nickel peroxide (equivalent to or twice the theoretical amount), and the resultant mixture is stirred for 3 hours at 50° C. and then filtered. Removing the solvent from the filtrate, there is obtained the corresponding tolualdehyde. The yields calculated by the hydrazone method are set forth as follows:

| Starting alcohol | Nickel peroxide (a) | Reaction product | Yield (percent) |
|---|---|---|---|
| o-Methylbenzyl alcohol | 1.0 | o-Tolualdehyde | 75.8 |
| m-Methylbenzyl alcohol | 1.0 | m-Tolualdehyde | 57.7 |
| p-Methylbenzyl alcohol | 1.0 | p-Tolualdehyde | 64.5 |
| p-Methylbenzyl alcohol | 2.0 | p-Tolualdehyde | 81.0 | a Ratio of nickel peroxide to benzyl alcohol based on the available oxygen.

*Example 7*

Oxidation of α-furfuryl alcohol.—To a solution of α-furfuryl alcohol (3.043 g.) in benzene (30 ml.), there is added nickel peroxide (1.2 times the theoretical amount), and the resultant mixture is stirred for 10 hours at 30° C. and then filtered. Removing the solvent from the filtrate, there is obtained furfural in a yield of 77.8%.

*Example 8*

Oxidation of 2-buten-1-ol.—To a solution of 2-buten-1-ol (3 g.) in ether (30 ml.), there is added nickel peroxide (twice the theoretical amount), and the resultant mixture is stirred for 6 hours at 20° C. and then filtered. Removing the solvent from the filtrate, there is obtained the crude crotonaldehyde, which is treated with 2,4-dinitrophenylhydrazine hydrochloride in a conventional manner whereby crotonaldehyde hydrazone (2.15 g.) is obtained as crystals melting at 187° C.

*Example 9*

Oxidation of allyl alcohol.—To a solution of allyl alcohol (3.0 g.) in either (30 ml.), there is added nickel peroxide (1.5 times the theoretical amount), and the resultant mixture is stirred for 6 hours at 20° C. and then filtered. Removing the solvent from the filtrate, there is obtained acrolein in a yield of 79%.

*Example 10*

Oxidation of geraniol.—To a solution of geraniol (5 g.) in benzene (90 ml.), there is added nickel peroxide (twice the theoretical amount), and the resultant mixture is stirred for 6 hours at 50° C. and then filtered. Removing the solvent from the filtrate, there is obtained citral (4.05 g.) of which the purity is 91.6%.

*Example 11*

Oxidation of vitamin A.—To a solution of vitamin A (100 mg.) in petroleum ether (15 ml.), there is added nickel peroxide (250 mg.), and the resultant mixture is stirred for 1 hour at room temperature (15 to 20° C.) and then filtered. Removing the solvent from the filtrate, there is obtained the oily retinene in a yield of 79.1%.

*Example 12*

Oxidation of codeine.—To a solution of codeine (700 mg.) in benzene (25 ml.), there is added nickel peroxide (twice the theoretical amount), and the resultant mixture is stirred for 6 hours at 50° C. and then filtered. Removing the solvent from the filtrate, there is obtained crude crystals (693 mg.) of codeinone.

What is claimed is:

1. A process for the oxidation of unsaturated alcohol selected from the group consisting of allylic alcohols and benzylic alcohols to give the corresponding carbonyl compound, which comprises treating the said unsaturated alcohol with nickel peroxide in inert organic solvent medium at a temperature between 0 and 90° C., the said nickel peroxide being prepared by treating salt of nickel with a member selected from the group consisting of alkali hypohalites and alkali persulfates in aqueous alkaline medium.

2. A process according to claim 1, wherein the oxidation is effected with one to two equivalents of nickel peroxide.

3. A process for the oxidation of unsaturated alcohol selected from the group consisting of allylic alcohols and benzylic alcohols to give the corresponding carbonyl compound, which comprises treating the said unsaturated alcohol with nickel peroxide in inert organic solvent medium at a temperature between 0 and 30° C., the said nickel peroxide being prepared by treating salt of nickel with a member selected from the group consisting of alkali hypohalites and alkali persulfates in aqueous alkaline medium.

4. A process according to claim 3, wherein the oxidation is effected with one to two equivalents of nickel peroxide.

5. A process for the oxidation of unsaturated alcohol selected from the group consisting of allylic alcohols and benzylic alcohols to give the corresponding carbonyl compound, which comprises treating the said unsaturated alcohol with nickel peroxide in inert organic solvent medium at a temperature between 0 and 90° C., the said nickel peroxide being prepared by treating nickel sulfate with sodium hypochlorite in aqueous sodium hydroxide solution at a temperature between 10 and 25° C., collecting the precipitate by filtration, washing the collected precipitate with water and drying the resultant powder over anhydrous calcium chloride under reduced pressure.

References Cited by the Examiner

UNITED STATES PATENTS 2,042,220   5/1936   Groll et al. _____ 260—603
2,051,266   8/1936   McAllister et al. _____ 260—603

(Other references on following page)

FOREIGN PATENTS 127,388   8/1900   Germany.

OTHER REFERENCES

Goralevich: Chem. Abstracts, vol. 25, col. 2931 (1931).

Howell: J. Chem. Soc. (London), vol. 123, pp. 669–76 (1923).

Krepelka et al.: Coll. Czech. Chem. Comm., vol. 9, pp. 497–520 (1937).

Nakagawa et al.: J. Org. Chem., vol. 27, pp. 1597–1601 (1962).

Noller: Chemistry of Organic Compounds, 2d ed., p. 530 (1957).

NICHOLAS S. RIZZO, *Primary Examiner.*

DUVAL T. McCUTCHEN, JOHN D. RANDOLPH,
*Examiners.*